(12) United States Patent
Oh

(10) Patent No.: US 6,454,069 B2
(45) Date of Patent: Sep. 24, 2002

(54) ONEWAY CLUTCH BEARING

(75) Inventor: Chul-Suk Oh, Seoul (KR)

(73) Assignee: Shin A Sports Co., Ltd., Inchon (KR)

( * ) Notice: Subject to any disclaimer, the term of this patent is extended or adjusted under 35 U.S.C. 154(b) by 0 days.

(21) Appl. No.: 09/729,017

(22) Filed: Dec. 4, 2000

(30) Foreign Application Priority Data

Dec. 6, 1999 (KR) ............................................ 99-55092

(51) Int. Cl.[7] .............................................. A01K 89/00
(52) U.S. Cl. ...................... 192/45; 192/47; 188/82.84
(58) Field of Search .............................. 192/44, 45, 47; 188/82.1, 82.84, 82.3

(56) References Cited

U.S. PATENT DOCUMENTS

| | | | | |
|---|---|---|---|---|
| 5,494,232 A | * | 2/1996 | Hirano et al. ............... | 188/82.3 |
| 5,662,197 A | * | 9/1997 | Tabe ....................... | 188/82.84 |
| 5,878,972 A | * | 3/1999 | Okada et al. ............... | 242/247 |
| 5,941,355 A | * | 8/1999 | Iga ......................... | 192/45 |
| 6,003,799 A | * | 12/1999 | Jung ........................ | 192/45 |
| 6,019,301 A | * | 2/2000 | Hitomi ...................... | 188/82.3 |
| 6,050,512 A | * | 4/2000 | Jung ........................ | 188/82.84 |

* cited by examiner

*Primary Examiner*—Saul Rodriguez
(74) *Attorney, Agent, or Firm*—Welsh & Katz, Ltd.

(57) ABSTRACT

An oneway clutch bearing used for preventing a reverse rotation of a spinning reel during fishing is disclosed. The clutch bearing comprises a housing made of plastic resin, and including an outer wall, an inner wall, and a bottom portion engaging the outer wall and the inner wall the bottom portion being provided at its center with a circular opening, and a plurality of bearing supporting bars being protruded at a constant interval from an edge of the circular opening a bearing holder made of plastic resin, and rotatably disposed between the outer wall and inner wall of the housing; a bearing guide disposed above the bearing holder, inserted between the inner wall and the outer wall of the housing, and having a plurality of arcuate recesses to receive the rollers; and a cover mounted onto an opened end of the housing.

4 Claims, 3 Drawing Sheets

ONEWAY CLUTCH BEARING

FIELD OF THE INVENTION

The present invention relates to an oneway clutch bearing, and more particularly to an oneway clutch bearing used for preventing a reverse rotation of a spinning reel during fishing.

BACKGROUND OF THE INVENTION

A conventional apparatus for preventing reverse rotation of a spinning reel is generally provided by a click gear installed inside a rotor of the spinning reel.

For example, Korean Utility Model Publication No. 94-7711, which was assigned to Taiwa Seiko Corporation, discloses an apparatus for preventing reverse rotation of a spinning reel comprising an axis integrally formed on a stopper click coupled with a reverse click gear inside a convexed portion of a rotor. A movable member of the stopper click is operated by an actuating arm, and the axis is journalled on the front of a main body of the reel by the movable member.

A movable body is integrally installed at the axis of the main body of the reel. The movable body is operated by a cam portion of the actuating arm having a lever supported inside the main body of the reel The stopper click is provided with a spring, so that the stopper click is meshed with the click gear 3 to prevent the reverse rotation.

According to the construction of the conventional apparatus for preventing reverse rotation of the spinning wheel as described above, if the lever is moved toward the left side by the actuating arm and thus the stopper click is supported in a state of engaging the stopper click with the click gear for preventing reverse rotation, the rotor can be rotated in the clockwise direction but not in the counterclockwise direction due to the engaged state of the stopper click and the click gear. Meanwhile, if the lever is moved toward the right side by the actuating arm so that the stopper click is in a state of disengaging the stopper click from the click gear, the rotor can be freely rotated in either direction.

However, the conventional apparatus for preventing reverse rotation has a problem that the rotor slips upon preventing the reverse rotation. Therefore, it is a general practice to enlarge a gear tooth portion to ensure the engaged state of the stopper click and the click gear. The number of gear teeth reduces in inverse proportion to the size of the gear tooth section, and the reduction of the number of the gear teeth increases the angle of the guidance to reverse rotation. This disables a prompt prevention of the reverse rotation.

Moreover, when a stopper click is positioned on a ridge of the gear, if the lever is moved toward the right side for the purpose of preventing the reverse rotation, the rotor slips off the same length as the gear tooth portion until the end portion of the click reaches a valley of the gear tooth portion. Accordingly, the conventional apparatus for preventing reverse rotation has a drawback of not fully guaranteeing an instantaneous braking.

Meanwhile, Japanese Utility Model Laid-Open No. 64-38963 discloses an apparatus for preventing reverse rotation, in which an oneway clutch bearing is mounted around the internal circumference of a latch wheel, and a number of rollers of the oneway clutch bearing are fitted around the external circumference of a bushing of a rotating axis.

However, the above apparatus has a drawback in that the rolling velocity of the roller contacting surface decreases due to the small diameter of the rotating bushing, into which the rollers are fitted. This creates a problem of not fully guaranteeing an instantaneous braking. Also, a load is partially put on the abutting surface of each component when preventing reverse rotation, thereby resulting in a possible deformation and a low durability of the roller.

The conventional bearing has no on/off switching function, and operates in uni-direction, thereby posing a problem of additionally providing a separate apparatus around the periphery of the oneway clutch bearing. For instance, the apparatus disclosed in Japanese Patent Laid-Open No. 64-38963 has a construction in which a gear is fitted into an outer periphery of the oneway clutch bearing to prevent its rotation, while the gear teeth are detachably engaged with the gear. Thus, the conventional apparatus not only has a complicated construction but also requires a wide mounting space.

In view of the above drawbacks, U.S. Pat. No. 5,494,232 issued to Hirano et al. on Feb. 27, 1996 ("Hirano") discloses another apparatus for preventing reverse rotation of a spinning reel used for fishing. Referring to FIG. 4, the apparatus for preventing reverse rotation disclosed in Hirano comprises a circular holder 109 rotatably mounted on a bushing, a circular external frame 110 rotatably fixed on a reel casting, and rolling members 107 retained by the circular holder 109 and the circular external frame 110. The circular holder 109 comprises a guide recess 108 for receiving the rolling members 107 therein. Each guide recess 108 has an open slot 108' at its lower portion, and the rolling members 107 received by the guide recess 108 through the open slot 108' is partially exposed to be contacted with the bushing. The rolling members 107 contact with the internal surface of the circular external frame 110 to function as a wedge. A spring 111 is provided inside the guide recess 108 for biasing the rolling members 107 to wedge the bushing 6.

According to the above construction, the spiral function of the rolling members 107 is generated by the internal circumference. Specifically, if the rolling members 107 are positioned at the concave portion 122 by means of the rectangular internal surfaces 121, 123 of the circular external frame 110, the bushing can freely rotate in clockwise and counterclockwise directions. However, if the rolling members 107 are positioned apart from the concave portion 122, reverse rotation of the bushing is prevented due to a frictional contact with the rolling members 107.

According to the above construction, one of the rolling members 107 is received between the two internal surfaces 121, 123 of the circular external frame 110. Thus, the internal surface of the circular external frame 110 has an octagonal shape. Considering the size of the apparatus as well as the rotation in both directions of the circular holder mounted on the spinning reel, it is practically impossible for the internal surface to have a geometrical shape which is more rectangular than octagonal. Accordingly, the number of rolling members is limited to four. In that case, if any of the rolling members 107 is damaged or the function of the spring for easing the rolling members deteriorates, the bushing is offset to that direction, thereby being unable to prevent reverse rotation of the bushing. Also, the apparatus for preventing reverse rotation as disclosed in the aforementioned patent has a complicated construction with numerous fittings, thereby increasing the manufacturing cost.

Another clutch bearing is disclosed in Korean Utility Model Unexamined Publication No. 96-10656, as shown in FIG. 5. The clutch bearing includes a bearing cover with a clearance adjusting groove formed on an inner surface, and a bearing holder with a roller bearing. The clutch bearing has some problems as below followings:

Firstly, since the bearing holder is made of a metal, it is difficult to precisely machine bearing receiving grooves and bearing guide protrusions of the bearing holder.

Secondarily a spring supporting the roller bearing is separate from the bearing holder. Accordingly, because the bearings are inserted into the bearing holder through the bearing receiving grooves formed on an outer periphery of the bearing holder, the bearing holder has to be maintained in a horizontal State to receive the bearings. Also, while all of bearings are completely inserted into the bearing holder, the bearing holder can be inserted into the bearing cover. This assembling operation is very cumbersome, and a time needed to assembly it is extended.

Finally, since the spring is separately inserted into the bearing holder, the spring has to have a shape of K so that the spring can smoothly operate. Because the spring has a short length due to its shape, the bearing is stiff in an off-mode,

SUMMARY OF THE INVENTION

Therefore, an object of the present invention is to resolve the above problems, and to provide an oneway clutch bearing capable of being assembled easily.

Another object of the present invention is to provide an oneway clutch bearing capable of preventing a roller bearing from being contacted with a bushing in an on-mode.

To achieve the above object, there is provided an oneway clutch bearing using a frictional force between roller bearings and a bushing, the clutch bearing comprising: a housing made of plastic resin, and including an outer wall, an inner wall, and a bottom portion engaging the Outer wall and the inner wall, the bottom portion being provided at its center with a circular opening, and a plurality of bearing supporting bars being protruded at a constant interval from an edge of the circular opening, a bearing holder made of plastic rosin, and rotatably disposed between the outer wall and inner wall of the housing; a bearing guide disposed above the bearing holder, inserted between the inner wall and the outer wall of the housing, and having a plurality of arcuate recesses to receive the rollers, and a cover mounted onto an opened end of the housing.

A height of the bearing supporting bar is slightly higher than that of the outer and inner walls, so that the free end of the bearing supporting bar is inserted to the cover. A plurality of through openings arc formed between the outer wall and the inner wall.

The bearing holder includes a circular base, a tap protruded downward from the base, a plurality of retaining bars protruded upward from the base, and an inverse-U shaped resilient member. The circular base of the bearing bolder is inserted into the hollow portion of the housing, with the tap being inserted into a slit of the housing.

According to the present invention, since the length of the spring of the bearing holder is short, the tension of the spring is weak, thereby making the rotation in clockwise direction smooth.

The oneway clutch bearing of the present invention provides an advantage in that since the spring guide can be made by a drawing process, the manufacturing time and cost are shorter than those of a conventional clutch bearing.

Also, since the upper side of the housing is opened, the bearing holder, the bearing guide, and the roller bearing can be inserted into the housing by turns, so that the assembly of the clutch bearing is easy.

BRIEF DESCRIPTION OF THE DRAWINGS

The above object and other advantages of the present invention will become more apparent by the preferred embodiment thereof with reference to the accompanying drawings, in which.

DETAILED DESCRIPTION OF THE PREFERRED EMBODIMENTS

Figure 1:
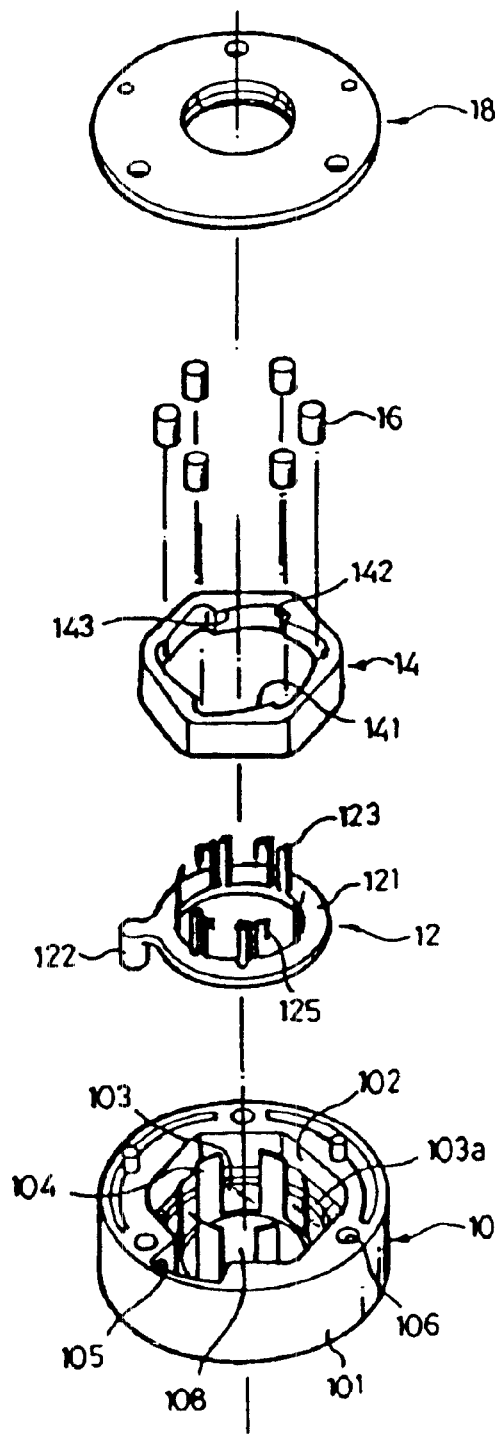
FIG. 1 is an exploded perspective view of the oneway clutch bearing according to a preferred embodiment of the present invention.
Figure 2:
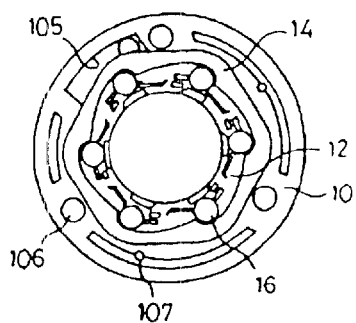
FIG. 2 is a plan view illustrating an assembled state of the oneway clutch bearing of FIG. 1.

FIG. 1 is an exploded perspective view of the oneway clutch bearing according to the present invention. Referring to FIG. 1, the clutch bearing of the present invention comprises a housing 10 having one open side and the other closed side.

The housing 10 is made of plastic resin, and includes a circular outer wall 101, a hexagonal inner wall 102, and a bottom portion 103 engaging the outer wall and the inner wall. The bottom portion 103 is provided at its center with a circular opening 108. A number of bearing supporting bars 104 are protruded at a constant interval from an edge of the circular opening 108, and a cavity is formed between the inner wall 102 and the bearing supporting bar 104. A height of the bearing supporting bar 104 is slightly higher than that of the outer and inner walls 101 and 102. A free end of the bearing supporting bar 104 is inserted and fixed to a groove of a cover 18 as described below. A slit 105 having a constant size and a number of through openings 106 are formed between the outer wall 101 and the inner wall 102.

A bearing holder 12 made of plastic resin is rotatably disposed in a hollow portion of the housing 10. The bearing holder 12 includes a circular base 121, a tap 122 protruded downward from the base 121, a plurality of retaining bars 123 protruded upward from the base 121, and an inverse-U shaped resilient member 125 each positioned adjacent to the retaining bar 123. The retaining bar 123 consists of a first inside bar and a second outside bar, the second bar having a width wider than that of the first bar and engaged to the first bar.

The circular base 121 of the bearing holder 12 is inserted into the hollow portion of the housing 10, with the tap 122 being inserted into the slit 105 of the housing 10. The housing 10 has a step portion 103a on a bottom portion thereof, and the base 121 of the bearing holder 12 is positioned on the lower bottom of the hollow portion. The tap 122 of the bearing holder 12 is protruded downward from the bottom of the housing, so that the bearing holder 12 is movable by operation of the tap. If the tap 122 moves in the left or right direction, the oneway clutch bearing is switched in an on/off-mode. The "on-mode" means that the oneway clutch bearing rotates in one direction, The "off-mode" means that the oneway clutch bearing can freely rotate clockwise and counterclockwise.

A bearing guide 14 is forcedly fitted into the hollow portion of the housing 10, with the bearing holder 12 being inserted into the hollow portion of the housing. It should be noted that the bearing guide 14 is positioned on the upper bottom of the hollow portion not to prevent the bearing holder 12 from rotating.

While the outer periphery of the bearing guide 14 has a hexagonal shape to coincide with the shape of the inner wall 102, the bearing guide is provided on its inner periphery with a number arcuate recesses to receive the rollers 16. These recesses arc formed in such a way that each recess has a deep portion 142 and a swallow portion 143, and the bearing holder is made by a drawing process.

The bearing holder 12, the bearing guide 14, and the roller bearings 16 are mounted in the hollow portion of the housing 10 by turns, and then the cover 18 is inserted into the opened end of the housing.

The operation of the oneway clutch bearing according to the present invention will now be explained with reference to FIGS. 3 and 4.

Figure 3:
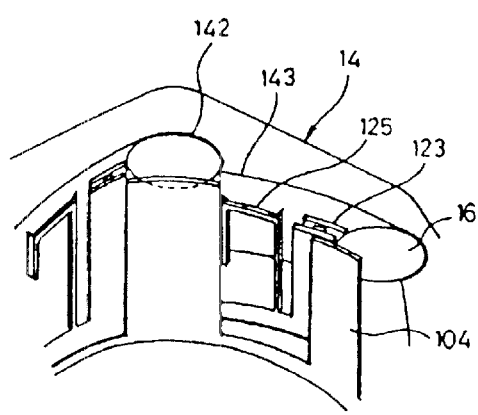
FIG. 3 is a view illustrating an on-mode of the oneway clutch bearing according to the present invention.

FIG. 3 shows the off-mode of the oneway clutch bearing, In that state, the roller bearing 16 is positioned on the deep portion 142 of the bearing guide 14, and is positioned at the back of the bearing supporting bar 104. The bushing (not shown) is contacted with the bearing supporting bar, but not contacted with the roller bearings. Accordingly, since the bushing is not restricted by the roller bearings the bushing is freely rotatable in any directions.

Figure 4:
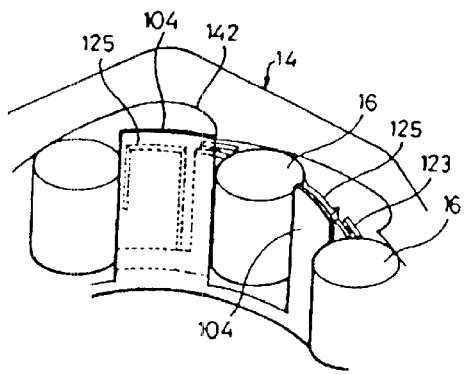
FIG. 4 is a view illustrating an off-mode of the present invention in an assembled state.
Figure 5:
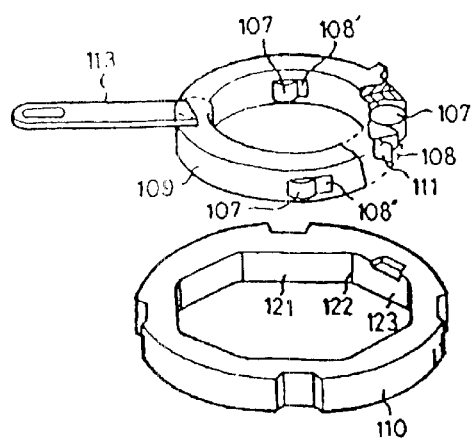
FIG. 5 is a partially perspective view of a conventional oneway clutch bearing.

FIG. 4 shows the on-mode of the oneway clutch bearing. If the bearing holder 12 rotates counterclockwise as shown in the figure, the roller bearings 16 disposed between the bearing supporting bar 123 and the spring 125 rotate counterclockwise, At that time, the roller bearings are disposed on the swallow portion 143 of the recess. When the roller bearings 16 rotates clockwise with the roller bearings being contacted with the bushing, the roller bearings tend to roll to the right along the shallow portion of the recess. At that time, if a clearance does not east between the roller bearings 16 and the inner periphery of the spring guide 14, and if a clearance does not exist between the roller bearings and the bushing, the roller bearings does not roll between the spring guide and the bushing. In other words, the counterclockwise rotation of the bushing is restricted by 6 roller bearings.

It should be noted that the spring 125 is disposed at a right side of the roller bearing 16. Specifically, the roller bearing 16 is slightly movable toward the right side against the biasing force of the spring in the on-mode of the clutch bearing. Accordingly, when the bushing rotates, the roller bearing does not apply a resisting force to the bushing.

With the construction of the oneway clutch bearing, since the length of the spring of the bearing bolder is short, the tension of the spring is weak thereby making the rotation in clockwise direction smooth.

While the present invention has been described and illustrated herein with reference to the preferred embodiment thereof it will be understood by those skilled in the art that various changes in form and details may be made therein without departing from the spirit and scope of the invention.

What is claimed is:

1. An oneway clutch bearing using a frictional force between roller bearings and a bushing, the clutch bearing comprising:
   a housing including an outer wall, an inner wall, and a bottom portion engaging the outer wall and the inner wall, the bottom portion being provided at its center with a circular opening, and a plurality of bearing supporting bars being protruded at a constant interval from an edge of the circular opening;
   a bearing holder made of plastic resin, and rotatably disposed in the housing;
   a bearing guide disposed adjacent the bearing holder, and having a plurality of arcuate recesses to receive the rollers; and
   a cover mounted onto an opened end of the housing;
   wherein a height of the bearing supporting bar is higher than that of the outer and inner walls, so that a free end of the bearing support bar is inserted to the cover; and
   wherein a plurality of through opening are formed between the outer wall and the inner wall.

2. An oneway clutching bearing using frictional force between roller bearing and a bushing, the clutch bearing comprising:
   a housing including an outer wall, an inner wall, and a bottom portions engaging the outer wall and the inner wall, the bottom portion being provided at it center with a circular opening and a plurality of bearing supporting bars being protruded at a constant interval from an edge of the circular opening;
   a bearing holder made of plastic resin, and a rotably disposed in the housing;
   a bearing guide disposed adjacent the bearing holder and having a plurality of arcuate recesses to receive the rollers; and
   a cover mounted onto an opened end of the housing;
   wherein the bearing holder includes a circular base, a tap protruded downward from the base, a plurality of retaining bars protruded upward from the base, and an inverse-U shaped resilient member.

3. The oneway clutch bearing as claimed in claim 2, wherein the circular base of the bearing holder is inserted into the hollow portion of the housing, with the tap being inserted into a slit of the housing.

4. The oneway clutch bearing as claimed in claim 3, wherein the housing has a step portion on a bottom portion thereof, the base of the bearing holder is positioned on a lower bottom of the housing, and a the bearing guide is positioned on an upper bottom of the housing.

* * * * *